United States Patent
DeLaet et al.

(10) Patent No.: US 10,226,691 B1
(45) Date of Patent: Mar. 12, 2019

(54) AUTOMATION OF IN-GAME PURCHASES

(71) Applicant: Electronic Arts Inc., Redwood City, CA (US)

(72) Inventors: Michael C. DeLaet, Foster City, CA (US); Robert Oshima, Orinda, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 209 days.

(21) Appl. No.: 14/169,139

(22) Filed: Jan. 30, 2014

(51) Int. Cl.
*A63F 9/24* (2006.01)
*A63F 13/00* (2014.01)
*G06F 17/00* (2006.01)
*G06F 19/00* (2018.01)
*A63F 13/30* (2014.01)

(52) U.S. Cl.
CPC .................................. *A63F 13/12* (2013.01)

(58) Field of Classification Search
CPC ........... A63F 13/00; A63F 13/17; A63F 13/25
See application file for complete search history.

(56) References Cited

U.S. PATENT DOCUMENTS

| | | |
|---|---|---|
| 5,816,918 A | 10/1998 | Kelly et al. |
| 5,933,813 A | 8/1999 | Teicher |
| 5,964,660 A | 10/1999 | James |
| 6,142,472 A | 11/2000 | Kliebisch |
| 6,190,225 B1 | 2/2001 | Coleman |
| 6,190,255 B1 | 2/2001 | Thomas |
| 6,306,033 B1 | 10/2001 | Niwa |
| 6,347,996 B1 | 2/2002 | Gilmore |
| 6,402,619 B1 | 6/2002 | Sato |
| 6,561,904 B2 | 5/2003 | Locke |
| 6,604,008 B2 | 8/2003 | Chudley |
| 6,607,437 B2 | 8/2003 | Casey |
| 6,745,236 B1 | 6/2004 | Hawkins |
| 6,811,483 B1 | 11/2004 | Webb |

(Continued)

FOREIGN PATENT DOCUMENTS

| | | |
|---|---|---|
| KR | 1020130137431 | 12/2013 |
| WO | 2002026333 | 1/2002 |

(Continued)

OTHER PUBLICATIONS

New Feature: Tiered Tournaments and Tournament Updates, printed from http://community.kabam.com/forums/showthread.php?171349-New-Feat on Feb. 11, 2014, 2 pages.

(Continued)

*Primary Examiner* — Milap Shah
*Assistant Examiner* — Jason Pinheiro
(74) *Attorney, Agent, or Firm* — Knobbe, Martens, Olson & Bear, LLP

(57) ABSTRACT

An online gaming system for automating purchases of virtual items for users of the online game even when users are logged off. Users may input purchase instructions for setting and/or scheduling automatic purchases of virtual items through a shop interface. Purchase instructions may include purchase criteria which must be satisfied for the purchase to be realized. After a purchase is completed, the user's inventory of items may be updated to reflect the newly purchased items so that the user can use the items when logged in.

16 Claims, 4 Drawing Sheets

(56) References Cited

U.S. PATENT DOCUMENTS

| | | |
|---|---|---|
| 6,811,484 B2 | 11/2004 | Katz |
| 6,850,900 B1 | 2/2005 | Hare |
| 6,928,474 B2 | 8/2005 | Venkatesan |
| 7,050,868 B1 | 5/2006 | Graepel |
| 7,076,453 B2 | 7/2006 | Jammes |
| 7,136,617 B2 | 11/2006 | Libby |
| 7,156,733 B2 | 1/2007 | Chiang |
| 7,192,352 B2 | 3/2007 | Walker |
| 7,197,352 B2 | 3/2007 | Gott |
| 7,326,115 B2 | 2/2008 | Baerlocher |
| 7,381,133 B2 | 6/2008 | Thomas |
| 7,455,586 B2 | 11/2008 | Nguyen |
| 7,533,336 B2 | 5/2009 | Jaffe |
| 7,660,740 B2 | 2/2010 | Boone |
| 7,682,239 B2 | 3/2010 | Friedman |
| 7,698,229 B2 | 4/2010 | Hsu |
| 7,749,056 B2 | 7/2010 | Ando |
| 7,785,188 B2 | 8/2010 | Cannon |
| 7,813,821 B1 | 10/2010 | Howell |
| 7,819,749 B1 | 10/2010 | Fish et al. |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster et al. |
| 8,105,156 B2 | 1/2012 | Walker et al. |
| 8,147,340 B2 | 4/2012 | Brunet de Courssou et al. |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf et al. |
| 8,231,470 B2 | 7/2012 | Feeney et al. |
| 8,239,487 B1 | 8/2012 | Hoffman |
| 8,246,439 B2 | 8/2012 | Kelly et al. |
| 8,272,934 B2 | 9/2012 | Olive et al. |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall et al. |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker et al. |
| 8,317,584 B2 | 11/2012 | Aoki et al. |
| 8,317,601 B1 | 11/2012 | Luciano Jr. |
| 8,323,110 B2 | 12/2012 | Shibamiya et al. |
| 8,328,642 B2 | 12/2012 | Mosites et al. |
| 8,332,260 B1 | 12/2012 | Mysen |
| 8,332,544 B1 | 12/2012 | Ralls |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio et al. |
| 8,360,858 B2 | 1/2013 | LaRocca |
| 8,360,866 B2 | 1/2013 | VanLuchene |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann et al. |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett et al. |
| 8,409,015 B2 | 4/2013 | Vanluchene |
| 8,439,759 B1 | 5/2013 | Mello |
| 8,475,262 B2 | 7/2013 | Wolf et al. |
| 8,506,394 B2 | 8/2013 | Kelly et al. |
| 8,512,150 B2 | 8/2013 | Herrmann |
| 8,533,076 B2 | 9/2013 | Chu |
| 8,583,266 B2 | 11/2013 | Herbrich et al. |
| 8,636,591 B1 | 1/2014 | Hawk |
| 8,758,119 B1 | 6/2014 | BronsteinBendayan |
| 8,777,754 B1 | 7/2014 | Santini |
| 8,784,214 B2 | 7/2014 | Parks et al. |
| 8,790,185 B1 | 7/2014 | Caldarone |
| 8,821,260 B1 | 9/2014 | Desanti |
| 8,831,758 B1 | 9/2014 | Chu et al. |
| 8,843,557 B2 | 9/2014 | Ranade |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis et al. |
| 9,007,189 B1 | 4/2015 | Curtis et al. |
| 9,138,639 B1 | 9/2015 | Ernst |
| 9,256,887 B2 | 2/2016 | Santini |
| 9,257,007 B2 | 2/2016 | Santini |
| 9,259,642 B1 | 2/2016 | McNeill |
| 9,286,510 B2 | 3/2016 | Soohoo |
| 9,317,993 B2 | 4/2016 | Hardy |
| 9,375,636 B1 | 6/2016 | Wakeford |
| 9,403,093 B2 | 8/2016 | Harrington |
| 9,406,201 B2 | 8/2016 | Englman |
| 9,452,356 B1 | 9/2016 | Tsao |
| 9,452,364 B1 | 9/2016 | Curtis |
| 9,463,376 B1 | 10/2016 | Kim |
| 9,468,851 B1 | 10/2016 | Pieron |
| 9,610,503 B2 | 4/2017 | Pieron |
| 9,626,475 B1 | 4/2017 | Schultz |
| 9,656,174 B1 | 5/2017 | McLellan |
| 9,669,313 B2 | 6/2017 | Pieron |
| 9,682,314 B2 | 6/2017 | Kim |
| 9,789,407 B1 | 10/2017 | Pieron et al. |
| 9,814,981 B2 | 11/2017 | McLellan et al. |
| 9,873,040 B1 | 1/2018 | Kim et al. |
| 2002/0023039 A1* | 2/2002 | Fritsch ............... G06F 3/04847 705/37 |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry et al. |
| 2002/0119824 A1 | 8/2002 | Allen |
| 2002/0165794 A1 | 11/2002 | Ishihara |
| 2002/0183105 A1 | 12/2002 | Cannon et al. |
| 2002/0193162 A1 | 12/2002 | Walker et al. |
| 2003/0008713 A1 | 1/2003 | Ushiro et al. |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0174178 A1 | 9/2003 | Hodges |
| 2003/0190960 A1 | 10/2003 | Jokipii et al. |
| 2003/0216167 A1 | 11/2003 | Gauselmann |
| 2004/0002387 A1 | 1/2004 | Grady |
| 2004/0068451 A1 | 4/2004 | Lenk |
| 2004/0143852 A1 | 7/2004 | Meyers |
| 2004/0199471 A1* | 10/2004 | Hardjono ............... G06F 21/10 705/50 |
| 2004/0215524 A1 | 10/2004 | Parkyn |
| 2004/0224745 A1 | 11/2004 | Bregenzer |
| 2004/0225387 A1 | 11/2004 | Smith, III |
| 2004/0267611 A1 | 12/2004 | Hoerenz |
| 2005/0096117 A1 | 5/2005 | Katz et al. |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0058025 A1 | 3/2006 | Danieli |
| 2006/0063587 A1 | 3/2006 | Manzo |
| 2006/0100006 A1* | 5/2006 | Mitchell ............... G07F 17/32 463/9 |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |

(56) References Cited

U.S. PATENT DOCUMENTS

| | | |
|---|---|---|
| 2006/0287029 A1 | 12/2006 | Yoshinobu |
| 2006/0287102 A1 | 12/2006 | White et al. |
| 2007/0021213 A1 | 1/2007 | Foe et al. |
| 2007/0077988 A1 | 4/2007 | Friedman |
| 2007/0105615 A1 | 5/2007 | Lind |
| 2007/0111770 A1 | 5/2007 | Van Luchene ............ 463/7 |
| 2007/0129139 A1 | 6/2007 | Nguyen |
| 2007/0129147 A1 | 6/2007 | Gagner |
| 2007/0155485 A1 | 7/2007 | Cuddy et al. |
| 2007/0191101 A1 | 8/2007 | Coliz et al. |
| 2007/0191102 A1 | 8/2007 | Coliz et al. |
| 2007/0213116 A1 | 9/2007 | Crawford et al. |
| 2007/0233585 A1 | 10/2007 | Ben Simon |
| 2007/0281285 A1 | 12/2007 | Jayaweera |
| 2008/0004093 A1 | 1/2008 | Van Luchene |
| 2008/0032787 A1 | 2/2008 | Low |
| 2008/0058092 A1 | 3/2008 | Schwartz |
| 2008/0076527 A1 | 3/2008 | Low |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo et al. |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0268946 A1 | 10/2008 | Roemer |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0082099 A1 | 3/2009 | Luciano, Jr. et al. |
| 2009/0124353 A1 | 5/2009 | Collette |
| 2009/0204907 A1 | 8/2009 | Finn |
| 2009/0208181 A1 | 8/2009 | Cottrell |
| 2009/0210301 A1 | 8/2009 | Porter |
| 2009/0234710 A1 | 9/2009 | Belgaied Hassine |
| 2009/0280905 A1 | 11/2009 | Weisman |
| 2009/0315893 A1 | 12/2009 | Smith et al. |
| 2010/0022307 A1 | 1/2010 | Steuer et al. |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney et al. |
| 2010/0107214 A1 | 4/2010 | Ganz |
| 2010/0113162 A1 | 5/2010 | Vemuri et al. |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville et al. |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston ............ 705/8 |
| 2011/0045898 A1 | 2/2011 | Anderson |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0212756 A1 | 9/2011 | Packard |
| 2011/0218033 A1 | 9/2011 | Englman et al. |
| 2011/0227919 A1 | 9/2011 | Bongio et al. |
| 2011/0250954 A1 | 10/2011 | Braund |
| 2011/0256936 A1 | 10/2011 | Walker et al. |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly et al. |
| 2011/0282764 A1 | 11/2011 | Borst |
| 2011/0300923 A1 | 12/2011 | Van Luchene |
| 2011/0319152 A1 | 12/2011 | Ross |
| 2011/0319170 A1 | 12/2011 | Shimura et al. |
| 2012/0011002 A1 | 1/2012 | Crowe |
| 2012/0015714 A1 | 1/2012 | Ocko et al. |
| 2012/0015715 A1 | 1/2012 | Luxton et al. |
| 2012/0034961 A1 | 2/2012 | Berman et al. |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter et al. |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas et al. |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider et al. |
| 2012/0265604 A1* | 10/2012 | Corner ............ G06Q 30/02 705/14.39 |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | Van Luchene |
| 2012/0295699 A1 | 11/2012 | Reiche |
| 2012/0296716 A1 | 11/2012 | Barbeau |
| 2012/0302329 A1 | 11/2012 | Katz |
| 2012/0302335 A1 | 11/2012 | Gregory-Brown |
| 2012/0309504 A1 | 12/2012 | Isozaki |
| 2012/0311504 A1 | 12/2012 | Van Os et al. |
| 2012/0322545 A1 | 12/2012 | Arnone et al. |
| 2012/0322561 A1 | 12/2012 | Kohlhoff |
| 2012/0329549 A1 | 12/2012 | Johnson |
| 2012/0330785 A1 | 12/2012 | Hamick et al. |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg et al. |
| 2013/0006736 A1 | 1/2013 | Bethke |
| 2013/0012304 A1 | 1/2013 | Cartwright |
| 2013/0013094 A1 | 1/2013 | Parks et al. |
| 2013/0013326 A1 | 1/2013 | Miller et al. |

(56) References Cited

U.S. PATENT DOCUMENTS

| | | |
|---|---|---|
| 2013/0013459 A1 | 1/2013 | Kerr |
| 2013/0029745 A1 | 1/2013 | Kelly et al. |
| 2013/0036064 A1 | 2/2013 | Osvald |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman et al. |
| 2013/0095914 A1 | 4/2013 | Allen |
| 2013/0123005 A1 | 5/2013 | Allen et al. |
| 2013/0124361 A1 | 5/2013 | Bryson |
| 2013/0143670 A1* | 6/2013 | Junkin .............. G06Q 30/0283 463/42 |
| 2013/0151342 A1 | 6/2013 | Citron et al. |
| 2013/0173393 A1 | 7/2013 | Calman |
| 2013/0178259 A1 | 7/2013 | Strause et al. |
| 2013/0210511 A1 | 8/2013 | La Rocca |
| 2013/0217453 A1 | 8/2013 | Briggs |
| 2013/0217489 A1 | 8/2013 | Bendayan |
| 2013/0226733 A1 | 8/2013 | Evans |
| 2013/0237299 A1 | 9/2013 | Bancel et al. |
| 2013/0244767 A1 | 9/2013 | Barclay et al. |
| 2013/0260850 A1 | 10/2013 | Carpe |
| 2013/0288757 A1 | 10/2013 | Guthridge |
| 2013/0288787 A1 | 10/2013 | Yoshie |
| 2013/0290147 A1 | 10/2013 | Chandra |
| 2013/0303276 A1 | 11/2013 | Weston et al. |
| 2013/0303726 A1 | 11/2013 | Mozzarelli |
| 2013/0310164 A1 | 11/2013 | Walker |
| 2013/0324259 A1 | 12/2013 | McCaffrey |
| 2013/0339111 A1 | 12/2013 | Ross |
| 2013/0339228 A1 | 12/2013 | Shuster |
| 2013/0344932 A1 | 12/2013 | Adams et al. |
| 2014/0004884 A1 | 1/2014 | Chang |
| 2014/0011565 A1 | 1/2014 | Elias |
| 2014/0018156 A1 | 1/2014 | Rizzotti et al. |
| 2014/0033262 A1 | 1/2014 | Anders |
| 2014/0038679 A1 | 2/2014 | Snow |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0180725 A1 | 6/2014 | Ton-That |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2014/0379455 A1* | 12/2014 | Bous .................. G06Q 30/0239 705/14.35 |
| 2015/0011305 A1 | 1/2015 | Deardorff |
| 2015/0019349 A1 | 1/2015 | Milley |
| 2015/0031440 A1 | 1/2015 | Desanti |
| 2015/0065241 A1 | 3/2015 | McCarthy |
| 2015/0065256 A1 | 3/2015 | Cudak |
| 2015/0273320 A1 | 10/2015 | Pieron |
| 2015/0306494 A1 | 10/2015 | Pieron |
| 2015/0335995 A1 | 11/2015 | McLellan |
| 2015/0352436 A1 | 12/2015 | Pieron |
| 2016/0121219 A1 | 5/2016 | Kim |
| 2016/0236094 A1 | 8/2016 | Pieron |
| 2016/0361654 A1 | 12/2016 | Pieron |
| 2017/0326456 A1 | 11/2017 | Kawaguchi et al. |

FOREIGN PATENT DOCUMENTS

| | | |
|---|---|---|
| WO | 2013013281 | 1/2013 |
| WO | 2013116904 | 1/2013 |
| WO | 2013059639 | 4/2013 |
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

Wikipedia, Mafia Wars, <http://en.wikipedia.org/wiki/Mafia_Wars>, Jan. 28, 2012, 3 pages.

Quest item—WoWWiki—Your guide to the World of Warcraft <URL:http://www.wowwiki.com/Quest_Item> Retrieved on Apr. 16, 2014, 1 page.

"Building Structures". War2.warcraft.org. Online. Accessed via the Internet. Accessed Aug. 9, 2014. <URL:http://war2.warcraft.org/strategy/verybasics/building.shtml>, 3 pages.

"Clash of Clans". Wikipedia.org. Online. Accessed via the Internet. Accessed Aug. 9, 2014. <URL:http://en.wikipedia.org/wiki/Clash of Clans>, 3 pages.

"Gem calculation formulas", forum.supercell.net. Online. Accessed via the Internet. Accessed Aug. 9, 2014. <URL:http://forum.supercell.net/showthread.php/23028-Gem-calculation-formulas>, 3 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=A_Little_Extra_Never_Hurts_--.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

City Coins. CityVille Wikia. Online. Accessed via the Internet. Accessed Aug. 9, 2014. <URL: http://cityville.wikia.com/wiki/City_Coins>, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village what can I do >, Apr. 23, 2014, 9 pages.

"Behavioural Analytics & Campaigning", http://lotaris.com/behavioural._analytics_and._Campaigning.htm, screenshot access date May 24, 2012 2:21 PM, 1 page.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29 Hamari,Lehdonvirta.pdf, on May 26, 2015, 16 pages.

(56) References Cited

OTHER PUBLICATIONS

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online", available on Sep. 9, 2011, https://web.archive.org/web/20110927210155/http://en.wikipedia.org/wiki/Gaia_Online, 8 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne..., posted Tuesday, Mar. 27, 2012, screenshop access date May 24, 2012, 2:19 PM, 1 page.
Ozeagle, "What happens if . . . answers about account types" on Lotro forum, Jan. 18, 2011, <https://www.lotro.com/forums/showthread.php?377885-What-happens-if-answers-about-the-account-types> (16 pgs).
<http://lotro-wiki.com/index.php?title=Ouest:A_Little_Extra_Never_Hurts_--_Part_2&oldid=399366>, <http://lotrowiki.com/index.php?title=Getting_Started&oldid=349681 >. Links are to used articles. (7 pgs) Feb. 26, 2014.
"Lotro-Wiki.com" (evidence in regards to "Lord of the Rings Oline" MMORGP game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).
PCT International Search Report and Written Opinion for PCT/US2016/017637 dated Apr. 7, 2016, 12 pages.
"A Wondrous Drop Event and Double EXP", [dated Aug. 22, 2012]. From flyff-wiki. [online], [retrieved on Jan. 12, 2016]. Retrievedfrom the Internet <URL:http://flyff-wiki.webzen.com/wiki/A_Wondrous_Drop_Event_and_Double_EXP>. 2 pages.
"Flyff", [dated May 25, 2013]. From Wikipedia, The Free Encylopedia. [on line], [retrieved on Jan. 12, 2016]. Retrieved from the Internet<URL:https://en.wikipedia.org/w/index.php?title=Flynoldid=556751091 >. 4 pages.
"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll_of_Amplification_R>. 3 pages.
Elsword—Wikipedia, the free encyclopedia, URL: en.wikipedia.org/wiki/Elsword [Retrieved Feb. 21, 2013], 6 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
"Cataclysm Guide: Guild Advancement—Wowhead", http://www.wowhead.com/guide=cataclysm&guilds, printed Dec. 5, 2013, 4 pages.
Diablo 2, Blizzard Entertainment, Mar. 23, 2009, manual and online website, http://web.archive.Org/web/20090323171356/http:I/classic.battle.net/diablo 2exp/items/basics.shtml, 51 pages.
Dreamslayer's Enchanting and Upgrading Guide—With Pictures:D and Explanations, URL: forums.elswordonline.com/Topic5673.aspx [Retrieved Feb. 21, 2013], 10 pages.
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
Gem System—Street Fighter X Tekken, http://www.streetfighter.com/us/sfxtk/features/gem-system, printed Nov. 6, 2012, 6 pages.
"Getting Started" written by BoD, published on Oct. 13, 2011 and printed from URL <http://lotrowiki.com/index.php?title=Getting_Started&oldid=349681 >, 5 pages.
"Guild Housing System—FlyFF Wiki", http://flyff-wiki.gpotato.com/wiki/Guild Housing_System, printed Dec. 5, 2013, 5 pages.
"Kabam Community Forums> Kingdoms of Camelot> Kingdoms of Camelot Open Discussion >Open Discussion :Tournament of Might Prizes I Main Discussion thread", printed from http://community.kabam.com/forums/archive/index.php/t-43273.html, Oct. 24, 2011, 23 pages.
"Lotro Store" written by Elinnea, published on Dec. 15, 2011 and printed from URL <http://lotrowiki.com/index.php ?title=LOTRO_Store&oldid=396550>, 23 pages.
Main Page written by Starbusty, published on Dec. 12, 2011 and printed from URL <http://lotrowiki.com/index.php?title=Main_Page&oldid=394429>, 2 pages.
MapleStory—Guides—Equipment Upgrading 101: Enhancements, URL: maplestory.nexon.net/guides/game-play/systems/OOFlk; [Retrieved Jun. 24, 2013] 3 pages.
MapleStory—Guides—Equipment Upgrading 101: Potentials, URL:maplestory.nexon.net/guides/game-play/systems/OOFlj/ [Retrieved Jun. 24, 2013], 5 pages.
MapleStory—Guides—Equipment Upgrading 101: Scrolls, URL:maplestory.nexon.net/guides/game-play/systems/OOFFV/#mitigating [Retrieved Jun. 24, 2013], 4 pages.
MapleStory, Internet guide: http://maplestory.nexon.net/gu ides/game-play/systems/OOFlk/, http://maplestory.nexon.net/guides/game-play/systems/OOFlk,http://maplestory.nexon.net/guides/game-play/systems/OOFFV, Sep. 28, 2012, 12 pages.
Path of Exile—Forum—Beta General Discussion—Unique Items Compendium 60/71 URL:web.archive .o rg/web/20120608004658/http://www. path of exile .co m/fo rum/view-thread/ 12056 [Retrieved Jun. 24, 2013], 52 pages.
Profession—WoWWiki—Your guide to the World of Warcraft, URL: http://www.wowwiki.com/Profession, printed Nov. 6, 2012, 8 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_--_Part 1.&oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_--_Part_2&oldid=399366>, 2 pages.
"Rest—WoWWiki—Your guide to the World of Warcraft", printed from http://www.wowwiki.com/Rest, May 19, 2014, 2 pages.
Super Mario Bros. 3, NES Gameplay, http://www.youtube.com/watch?v=82TLAcm4ts, published on Mar. 14, 2009, 1 page.
Super Mario Bros. 3, StrategyWiki, the video game walkthrough and strategy guide, http://strategywiki.org/wiki/Super_Mario_Bros._3, Oct. 2, 2012, 4 page.
Super Mario Bros. 3 Review, Nintendo for NES, Feb. 1990, pp. 1-4.
TFF Challenge—UC Davis, http://tffchallenge.com/team/uc-davis/, printed Jan. 15, 2014, 12 pages.
The Arreat Summit—Items: Basic Item Information, URL: web.archive.org/~eb/20090323171356/http://classic.battle.net/diablo2exp/items/basics.shtml[Retrieved Feb. 21, 2013], 3 pages.
"Treasure Chest Game" written by Zelda Wiki, the Zelda encyclopedia; published on or before Oct. 17, 2012; accessible andprinted from URL <http://web.archive.org/web/20121017085058/http:I/zeldawiki.org/Treasure_Chest_Game>, 4 pages.

* cited by examiner

AUTOMATION OF IN-GAME PURCHASES

FIELD OF THE DISCLOSURE

This disclosure relates to automating purchases of virtual items in an online game.

BACKGROUND

Users may access virtual spaces via client computing platforms. A virtual space may include an online game taking place within the virtual space. Virtual items usable within the virtual space and/or online game may be offered for sale to the users. Virtual items may include one or more of a virtual weapon, a tool, a food, a currency, a reward, a bonus, health, a potion, an enhancement, a mount, a power-up, a speed-up, clothing, a vehicle, an anatomical feature of a character or game entity, a troop or troop type, a pet, a virtual resource, and/or other virtual items and/or goods.

Offers may be extended to users through a virtual shop. Offers may include reduced price sales and/or promotional sales related to the virtual items associated with the different offers. If users are logged off of the virtual space and/or the online game taking place within the virtual space, however, the users may miss an opportunity to purchase virtual items associated with one or more offers.

SUMMARY

Accordingly, one aspect of the disclosure relates to automating virtual items purchases in an online game. A user's gameplay experience may be enhanced through their interaction with the virtual items which are usable in the online game. Certain items may help the users to complete levels, obtain upgrades and achievements, and/or enhance other modes of gameplay. Users may obtain the virtual items by various mechanisms, for example, by purchase through a virtual shop, acquiring the virtual items through gameplay (e.g., as an upgrade, bonus, reward, or the like), and/or other considerations for obtaining virtual items. Purchase through a virtual shop may allow users to directly obtain virtual items and may be desired over other mechanisms which otherwise require users to "grind" through gameplay.

Purchases of virtual items may be solicited through offers to sell virtual items being extended to the users through a virtual shop. Offers to sell virtual items may be associated with promotional and/or discounted sales of the items which may be desirable since users can obtain the virtual items at less than face value. Offers may be extended periodically, as a one-time offer, randomly, and/or at other frequencies.

Offers may be extended at times when they are unavailable to take advantage of the offer, such as when the user is logged off of the virtual space and/or online game. Users may knowingly (and unknowingly) miss opportunities to obtain virtual items they desire. Thus the users may return to the game discouraged, and/or unmotivated to maintain their engagement in the online game.

The disclosure herein describes a system in which users can schedule one or more automatic purchases of virtual items based on parameters and criteria set by the users. Purchase can be executed even if the user is logged off of the virtual space and/or online game. This may further increase user engagement with the online game, enhance their overall gameplay experience, and/or provide other enhancements.

In some implementations, a system configured to automate virtual items purchases in the online game may comprise one or more physical processors configured to execute computer program components. The computer program component may include one or more of a game component, a user component, an offer component, a price component, a virtual shop component, an instruction component, a purchasing component, and/or other components.

The game component may be configured to execute an instance of a virtual space and/or an online game taking place within the virtual space. Executing the instance of the virtual space and/or online game may include implementing the instance of the virtual space and/or online game to facilitate participation of users in the virtual space and/or online game. The users may participate in the virtual space and/or online game through client computing platforms. The game component may host the online game for the client computing platforms in a client/server configuration.

The user component may be configured to manage virtual item inventories associated with the users of the online game. The inventories may include one or more virtual items available for use by the users in the virtual space and/or online game. The user component may be configured to manage a first inventory of virtual items available for use by a first user.

The offer component may be configured to effectuate extension of offer to sell virtual items usable in the online game to the users. The offers to sell virtual items may be associated with a discounted sale of the virtual items, a promotional sale of the virtual items, an introductory sale of the virtual items, and/or other considerations for offers to sell virtual items usable in the online game. Users may be presented offer communications which include information about an offer (e.g., the virtual items associated with the offer, prices, when the offer is going to be extended, etc.). Offer communications may include in-game communications (e.g., a banner ad), external communication (e.g., a text message), by displaying the offers in the virtual shop, and/or other techniques to communicate information about the offers to the users. Offer communications may be communicated to the users prior to the offers being extended, during a time period at which the offer is being extended, and/or other considerations. The offers may include a first offer to sell a first virtual item.

The price component may be configured to set sale prices of virtual items offered for sale in the different offers. Sales prices may be set in accordance with real and/or virtual currency denominations. Users may execute purchases of virtual items using one or more of real currency, virtual currency, and/or other consideration.

The virtual shop component may be configured to effectuate presentation of a shop interface to the users of the online game. The shop interface may be configured to display the offers and/or instances of virtual items to solicit virtual items purchases associated with the offers extended to the users. The shop interface may be configured to realize purchases of virtual items through one or more of an exchange of virtual consideration, real currency consideration, and/or other consideration.

The instruction component may be configured to receive purchase instructions defined by the users of the virtual space and/or online game. The purchase instructions may include criteria for triggering purchases of virtual items associated with offers extended to the users. The purchases may be triggered even if the users are logged off of the virtual space and/or online game. The instruction component may be configured to receive first purchase instructions from the first user of the online game.

The purchasing component may be configured to effectuate purchase of virtual items offered for sale triggered by criteria in purchase instructions being met. For example, by virtue of the first purchase instructions identifying the first virtual item for purchase, and by virtue of the sale price of the first virtual item being set to a level that satisfies criteria included in the first purchase instructions, the purchasing component may be configured to effectuate purchase of the first virtual item even if the first user is logged off of the virtual space and/or online game.

In some implementations, the purchasing component may be configured to, responsive to effectuating purchase of the first virtual item, even if the first user is logged off, update the first inventory to include the purchase of the first virtual item such that the purchase of the first virtual item is made available to the first user for use in the online game when the first user is logged into the online game.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
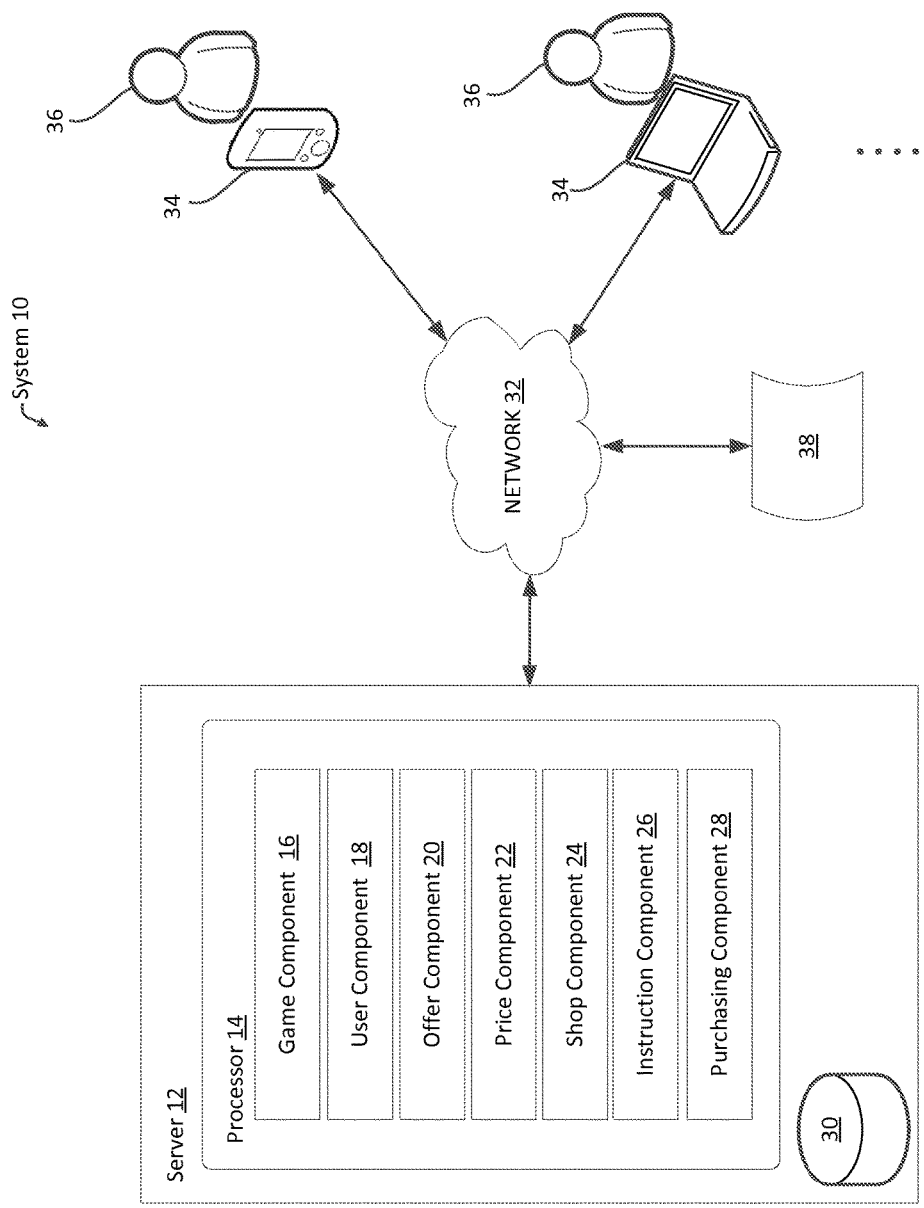
FIG. 1 illustrates a system for automating in-game purchases.

FIG. 1 illustrates a system 10 facilitating the automation of virtual item purchases in a virtual space. A virtual space may include an online game taking place within the virtual space. Virtual items may refer to virtual items which are usable in the online game.

Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a character or game entity, a troop or troop type, a pet, a virtual resource, a set or bundle of multiple virtual items, and/or other virtual items and/or goods. Virtual items and/or virtual goods may be usable within the virtual space and/or an online game that takes place in the virtual space.

The system 10 therein may facilitate the automation of purchases of virtual items for users of the virtual space even when users are logged off of the virtual space and/or the online game taking place in the virtual space. Purchases of virtual items may be realized using real and/or virtual currency. In some implementations, the system 10 may facilitate the automation of other in-game purchases and/or transactions, for example, an entry fee for a game tournament, a penalty fee incurred, an exchange of currency with other players, and/or other purchases and/or transactions.

In FIG. 1, providing the virtual space may include hosting the virtual space over a network 32, such as the Internet. A host server may include one or more processors configured to execute one or more computer components for implementing an instance of a virtual space and/or an online game taking place within the virtual space and to facilitate the participation of one or more users in virtual space and/or the online game. The host server may be a game server 12. The server 12 may include processor(s) 14.

The computer program components may include one or more of a game component 16, a user component 18, an offer component 20, a price component 22, a virtual shop component 24, an instruction component 26, a purchasing component 28, and/or other components. The server 12 may be configured to communicate with one or more client computing platforms 34, according to client/server architecture. The client computing platforms 34 can include, for example, a cellular telephone, a smartphone, a laptop, a tablet computer, a desktop computer, a television set-top box, smart TV, a gaming console, and/or other device suitable for the intended purposes as described herein and/or other considerations. The users 36 may access system 10 and/or the virtual space via client computing platforms 34.

The game component 16 may be configured to implement an instance of the virtual space executed by the computer components to determine state of the virtual space. The state may then be communicated (e.g., via streaming visual data, via object/position data, and/or other state information) from server 12 to client computing platforms 34 for presentation to users 36. The state determined and transmitted to a given client computing platform 34 may correspond to a view for a user character being controlled by a user 36 via input devices (e.g., a controller) at the given client computing platform 34. The state determined and presented to a given client computing platform 34 may correspond to a location in the virtual space (e.g., location in the game). The view described by the state for the given client computing platform 34 may correspond, for example, to the location from which the view is taken, the location the view depicts, and/or other locations, a zoom ratio, a dimensionality of objects, a point-of-view, and/or view parameters of the view. One or more of the view parameters may be selectable by the users 36.

An instance of the virtual space may comprise a simulated space that is accessible by users 36 via clients (e.g., client computing platforms 34) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by game component 16 is not intended to be limiting. The game component 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game component 16, users 36 may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user 36 with which it is associated. The user controlled element(s) may move through and interact with the virtual space (e.g., non-user characters in the virtual space, other objects in the virtual space). The user controlled elements controlled by and/or associated with a given user 36 may be created and/or customized by the given user. The user may have an "inventory" of virtual items and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 34. The users may interact with each other through communications exchanged within the virtual space. Such communications may include one or more of textual chat, instant messages, private messages, voice communications, and/or other communications. Communications may be received and entered by the users 36 via their respective client computing platforms 34. Communications may be routed to and from the appropriate users through server 12 (e.g., through game component 16) and/or through communications which are external to the system 10 (e.g., text messaging services associated with the client computing platforms 34).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, changes to the sales price of virtual items offered extended to the users, and/or other changes.

The user component 18 may be configured to access and/or manage one or more user profiles and/or user information associated with users of the system 10. The one or more user profiles and/or user information may include information stored by server 12, one or more of the client computing platforms 34, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), relationship information (e.g., information related to relationships between users in the virtual space), virtual space usage information (e.g., a log-in history indicating the frequency and/or amount of times the user logs-in to the user accounts, information related to the current log-in state of the user, and/or other information), demographic information associated with users, interaction history among users in the virtual space, information stated by users, browsing history of users, a client computing platform identification associated with a user, a phone number associated with a user, and/or other information related to users.

The user component 18 may be configured to manage the user's inventory of virtual items and/or currency that the users can use within the virtual space. A user may have a game inventory of one or more virtual items and/or currency that the user can use (e.g., by manipulation of one or more user characters or other user controlled element, and/or other items) to perform in-game actions within the virtual space. The inventory can be determined on a game-to-game basis for one or more games available within the virtual space, or for one or more games in one or more other virtual spaces. The inventor may encompass multiple inventories of virtual items across multiple games played by the user. By way of illustration in FIG. 2, the user component 18 may be configured to manage a first inventory 42 of virtual items available for use by a first user 40 of the virtual space.

Virtual items may be acquired by the user in one or more of a variety of ways. For example, virtual items may be acquired through gameplay, purchased by the user in a virtual shop, received from another user, bestowed on the user as a part of a promotion, and/or acquired in other ways. Acquiring virtual items through gameplay may include acquiring items by completing tasks such as finishing levels, defeating enemies, obtaining status, and/or other tasks, and/or by other gameplay mechanisms. Users may decide to complete certain tasks in order to acquire and/or upgrade to virtual items which are the result of completing the task. Users may receive items from one or more other users. Users may receive items from interaction with objects positioned within the virtual space capable of real-time interaction, and/or other mechanisms. Bestowing of items as part of a promotion may include promotions implemented by the game components 16 to reward the user, and/or other mechanism implemented by the game component 16. Acquiring items from a virtual shop may include purchasing items from a virtual shop within the virtual space. Purchase may include purchasing items using virtual currency, real currency, and/or other consideration. An instance of a virtual shop may be provided through the execution of a shop component 24, described in more detail below.

Returning to FIG. 1, the offer component 20 may be configured to effectuate extension of offers to sell virtual items usable in the online game to the users. The offers may be extended to the users through the virtual shop. Users may be presented offer communications which include information about the offer (e.g., the virtual items associated with the offer, prices, when the offer is going to be extended, etc.). Offer communications may be sent to users through various ways. Offer communications may include, for example notifications and/or messaging sent to the users, through display of the offers and/or the virtual items associated with the offers in a virtual shop, and/or other considerations.

Offer communications including notifications and/or messaging may be considered external and/or internal to the system 10. Internal notifications and/or messaging may refer to in-game messaging, e.g., messages sent through an in-game chat window, discussion board, banner-ad, promotion, and/or other considerations of messaging sent to users within the virtual space. External notifications and/or messaging may include messages sent to a mobile device associated with the user (e.g., text message), email notification sent to an external email address associated with the user, and/or other considerations. Offer communications associated with display in the virtual shop are described in more detail below.

Figure 2:
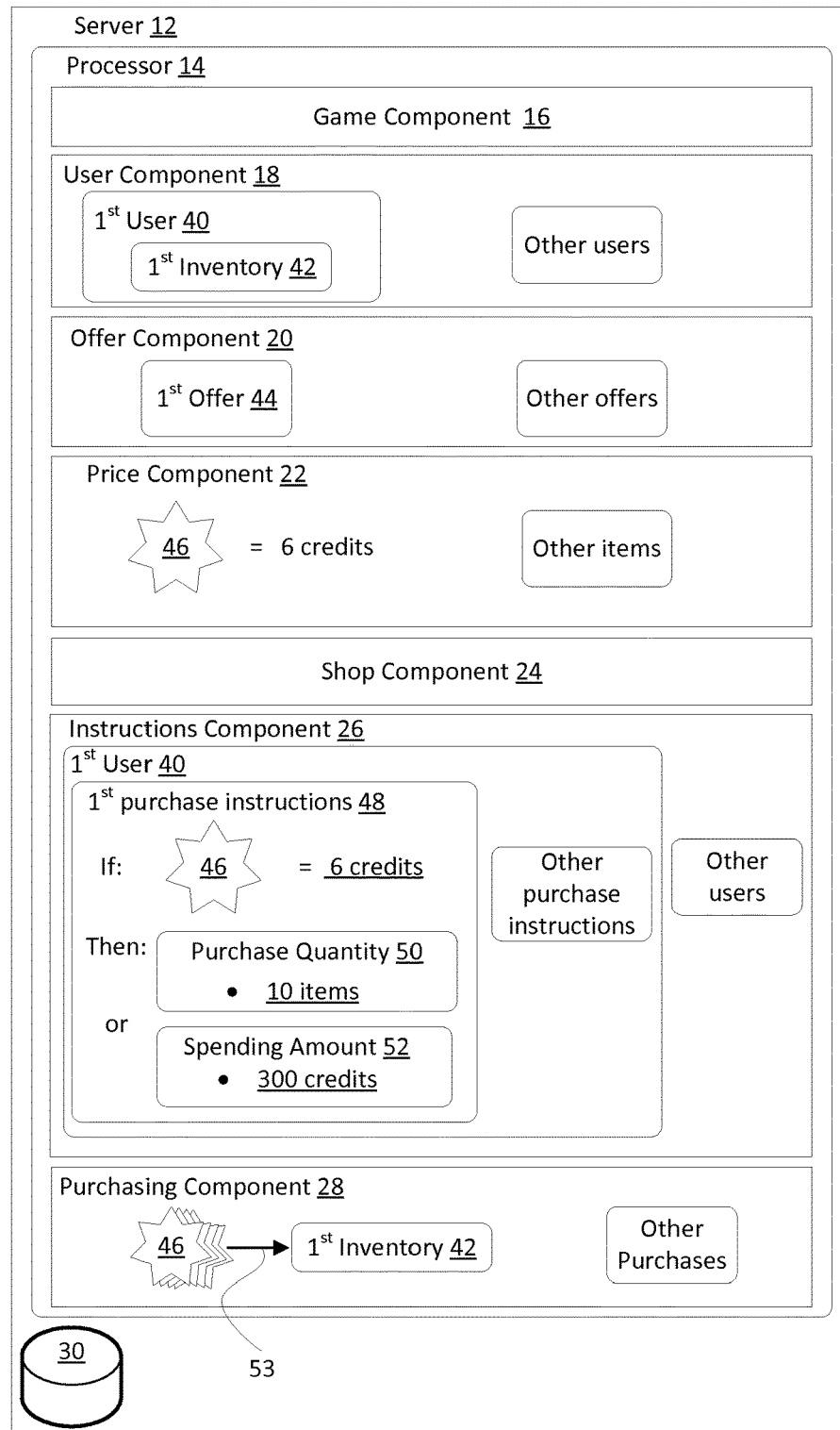
FIG. 2 illustrates an implementation of the server employed in the system depicted in FIG. 1.

By way of illustration, in FIG. 2, the offer component 20 may be configured such that the offers extended to users of the virtual space include a first offer 44 extended to one or more users of the virtual space, such as the first user 40. The first offer 44 may be an offer to sell a first virtual item 46 and/or an instance of the first virtual item 46. However it is noted that an offer to sell an instance of a virtual item may facilitate purchases of one or more instances of the virtual item. The first offer 44 may be extended to the users at a particular date and/or time. Users may be presented offer communications associated with the first offer 44.

Returning to FIG. 1, the price component 22 may be configured to set sale prices of virtual items offered for sale in the different offers. Sales prices may be real and/or virtual currency prices. Sales prices may be set according to one or more techniques described herein. In some implementations, promotional and/or reduced price items offers may be extended to the users, such that the price component 22 may be configured to set the sales price of a virtual item to a sale price which is lower than its previous sales price. Promotional and/or reduced price item sales prices may be set according to periodically extended offers, as a one-time offer to all users, as a special one-time offer to one or more specific users, and/or other considerations of offers extended to users where sales prices may be set lower than previous sales prices.

In some implementations, new virtual items may be introduced into the virtual space, such that the price component 22 may be configured to set the sales price of the new virtual items. For example, new virtual items may be set to introductory sales prices. In some implementations, after an item has been offered for sale for a time period and supply and demand needs change for the item, the price component 22 may be configured to set the sales prices to different sales prices, accordingly. In some implementations, the price component 22 may be configured to set sales prices based on input and/or entry of sales prices received from administrators of the system 10. The setting of sales prices of virtual items may be considered in other ways.

As an illustrative example, in FIG. 2, the price component 22 may be configured to set the sales price of the first virtual item 46 associated with the first offer 44 being extended to the users. For example the price component 22 may be configured to set the price of the first virtual item 46 to 6 credits (or other virtual and/or real currency amount) when the first offer 44 is extended to the users, such as the first user 36.

Returning to FIG. 1, the shop component 24 may be configured to effectuate presentation of a shop interface of a virtual shop to the users of the virtual space and/or online game taking place within the virtual space. The virtual shop may be a simulated environment within the virtual space which is accessible by users and presents the views of the virtual shop to the users. Users may access the virtual shop through one of a variety of ways. Users may access the virtual shop through the manipulation of one or more user characters associated with the user within the virtual space using control inputs and/or commands input by the users through client computing platforms, and/or other way of access.

Manipulation of a character may include moving the one or more user characters through the virtual space using control inputs and/or commands input by the users through client computing platforms, to move the one or more characters to the simulated environment designating the location of the virtual shop within the virtual space.

Users may use control inputs and/or commands not associated with the one or more user characters to access the virtual shop. Control inputs and/or commands may automatically present the instance of the game shop on the clients computing platforms (e.g., user selects a virtual shop button to automatically be taken to the game shop).

The instance of the virtual shop may be presented to users through the shop interface. The shop interface may be configured to present and/or display the offers to sell virtual items and/or instances of virtual items to solicit virtual items purchases from users associated with the offers being extended to the users of the online game through the virtual shop. The shop interface may be configured to receive entry and/or selection of individual offers by the users to effectuate acceptance and/or purchase of the offers at a virtual (or real) currency purchase price. The price of the virtual items presented in the virtual shop may be the price set by the price component 22 as described herein, and/or other considerations. According to one or more implementations of the present disclosure, the shop component 24 may be configured to realize purchases of virtual items even while users are log out of the virtual space and/or online game.

The simulated environment of the virtual shop may have topography. The virtual shop may express ongoing real-time interaction by one or more users (e.g., may have limited stock of virtual items for sale which can be purchased by one or more users within the virtual space which can be depleted), and/or include one or more objects (e.g., one or more virtual items, a virtual teller, and/or other objects) positioned within the topography that may be capable of locomotion within the topography. The virtual shop may display the content, and/or the one or more sets of virtual content available for purchase by the users. Users may view the virtual content (e.g., one or more virtual items and/or one or more sets of virtual items) available for purchase. Users may purchase the virtual content using virtual (or real) currency. Transactions may take place with the virtual teller, through various other actions of the user within the instance of the virtual shop, and/or other offer/transaction mechanisms.

The instruction component 26 may be configured to receive purchase instructions defined by the users of the online game to facilitate automatic purchase of virtual items even while users are logged out of the virtual space. The purchase instructions may include criteria for triggering the automatic purchases of virtual items associated with offers extended to the users, even if the users are logged off of the online game. As such, the purchasing instructions may allow users to purchase virtual items associated with offer which are extended to the users of the virtual space at times when the users are logged out of the virtual space and/or online game. By way of example, the system 10 may extend periodic promotional offers for discounted virtual items to the users of the online game, and the users may or may not know when such offers are going to be extended. Through the provision of submitting purchase instructions along with the various other mechanisms of the system 10 describe herein, the users may be able to automate purchases of the virtual items associated with extension of the reduced price offers and/or other offers.

In some implementations, criteria defined by the users may comprise price level criteria, which when satisfied by an offer being extended to the users, may trigger automatic purchases of virtual items in accordance with the offer even when the users are logged off of the virtual space. Price level criteria may be a specific price and/or price range (e.g., virtual or real currency) at which the users are willing to purchase the virtual items. Users may define the price level criteria such that by virtue of the sale price of the virtual item being set to a level (e.g., via the price component 22) that satisfies the price level criteria, purchase may be effectuated (e.g., via the purchasing component 28).

In some implementations, criteria defined by the users may comprise date criteria. Date criteria may be a specific date and/or date range defined by the user which will trigger automatic purchases of virtual items in accordance with one or more offers extended to the users at the specified date and/or within the date range. For example, by virtue of an offer being extended (e.g., via the offer component 20) to the users at a date which satisfies the date criteria, purchase may be effectuated (e.g., via the purchasing component 28). The date at which an offer is extended to the users may be known to the user for example, via offer communications sent to the users prior to the offer being extended.

In some implementations, purchase instructions may include a purchase quantity defined by the users. The purchase quantity entered and/or otherwise defined by the users may indicate the quantity of virtual items to purchase when the criteria is satisfied by an offer being extended to the users. The quantity of virtual items which is actually purchased may be subject to restrictions. For example the amount of virtual currency the user has available to spend on virtual item purchases may limit purchases of certain quantities of virtual items which would exceed their available funds amount. In the event that the user defines purchasing instructions including a quantity resulting in a purchase which exceeds the user's available funds (real or virtual), the user may be prompted that they have insufficient funds, the purchase quantity may be automatically reduced accordingly, the purchase may be canceled, the user may be prompted to change the quantity amount, the purchase may be effectuated as instructed and the users account may be debited to a negative balance (e.g., and the user subjected to a fine and/or penalty), and/or other considerations. In some implementations, offers to sell virtual items may include limitations as to how many virtual items can be purchased. For such offers, the execution of the purchase may be limited by the quantity limit.

In some implementations, purchase instructions may include a currency spending amount defined by the users. The currency spending amount may indicate the amount of currency to spend (e.g., debit from the user's currency account and/or inventory) on the purchase of virtual items when the criteria is satisfied by an offer being extended to the users. The currency amount which is actually debited when the purchase is effectuated may be subject to restrictions, similar to those described above.

By way of illustration, in FIG. 2, instructions component 26 may be configured to receive first purchase instructions 48 defined by the first user 40 of the online game. The first purchase instructions 48 may include purchase criteria for triggering automatic purchases of the first virtual item 46 (or other virtual items) when an offer to sell the first virtual item 46 is extended. For example purchase criteria may include price level criteria, such as 6 credits or other real or virtual currency amount (e.g., if the first virtual item is set to a price level equal to 6 credits, then effectuate purchase. First purchase instructions 48 may include a first quantity 50 defined by the first user 40 which indicates the quantity of the first virtual item 46 to purchase when the criteria included in the first purchase instructions 48 is satisfied (e.g., 10 items, or other amount). First purchase instructions 48 may include a first currency spending amount 52 defined by the first user 40. The first currency spending amount 52 may indicate the amount of currency to spend (e.g., debit from the first users currency account) on purchases of the first virtual item 40 when the criteria included in the first purchase instructions 48 is satisfied (e.g., 300 credits, or other amount). In some implementations, purchase instructions may include one or both of currency spending amount instructions or purchase quantity instructions.

Figure 3:
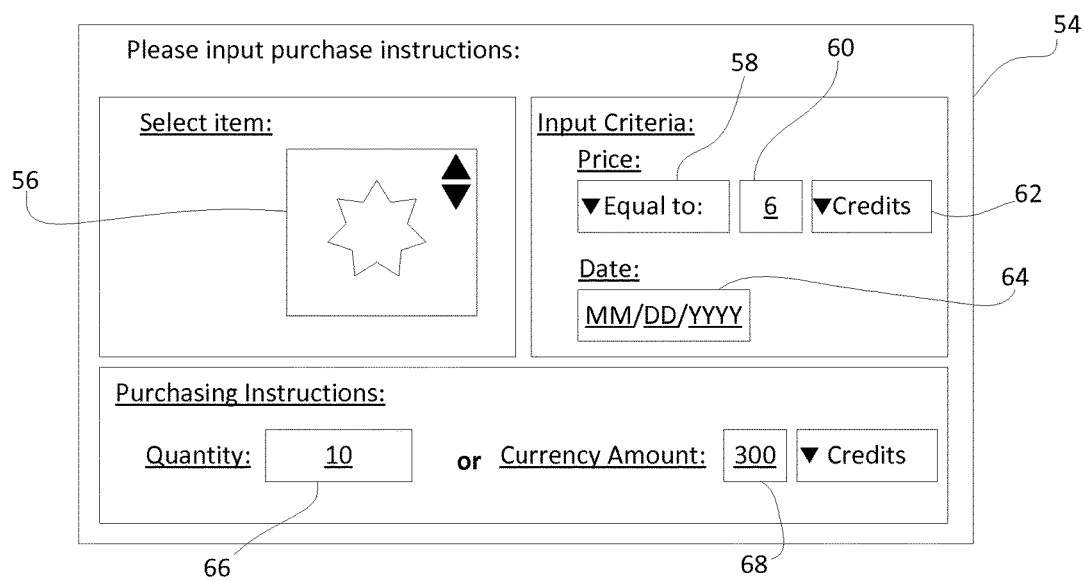
FIG. 3 illustrates an implementation of a user interface configured to receive user entry and/or selection of purchasing instructions.

Referring now to FIG. 3, the instructions component 26 may be configured to receive user-defined purchase instructions through entry and/or selection by the users via a user interface, similar to or same as interface 54. Interface 54 may facilitate user entry and/or selection of purchase instructions through one or more various entry and/or selection techniques, for example drop down menus, check boxes, direct text input, and/or other suitable selection and/or entry techniques. In some implementations, interface 54 may be configured such that users first select 56 the item they wish to automate the purchase of. Item selection 56 may be facilitated through a drop down menu displaying the various items graphically, by name, or other consideration.

The interface 54 may be configured to receive entry and/or selection of purchase criteria. For example, interface 54 may include text input box 60 facilitating direct text input of price level criteria. Users may select additional information related to the price level criteria, for example via drop down menus 58, 62, users may facilitate user selection whether price level criteria is related to an exact price (e.g., select "Equal to"), a threshold price (e.g., select "Greater than"), and/or other considerations (e.g., "Less than", "Not equal to", etc.). The interface 54 may be configured such that users can select the currency type and/or denomination (e.g., a virtual currency such as credits, virtual dollars, etc., and/or a real currency such as US dollars, etc.). In some implementations, the interface 54 may be configured such that users may enter and/or select date criteria, for example via a direct text input box 64 (e.g., and/or selection from a graphical representation of a calendar, or the like).

Interface 54 may be configured to facilitate user entry and/or selection of additional purchasing instructions such as purchase quantity text input box 66, currency spending amount text input box 68, and/or other additional purchasing instructions related to purchasing virtual items based on criteria being satisfied by an offer being extended to the users (e.g., a quantity amount of 10 items, or a currency spending amount of 300 credits). The interface 54 may facilitate user selection of the currency type and/or denomination when inputting a currency spending amount into the currency spending amount text input box 68.

Returning to FIG. 1, the purchasing component 28 may be configured to effectuate purchase of virtual items offered for sale through the shop interface triggered by criteria in purchase instructions being met by an offer which is being extended to the users. Effectuating purchase may include, for example, one or more of: checking a user's currency account for available funds (and prompting the user of insufficient funds if applicable), debiting the users account based on the appropriate currency amount (e.g., the amount for a specified purchase quantity and/or the specified currency spending amount), and transferring the appropriate quantity of purchased virtual items to the users inventory of items. For example, even if the user is logged off of the online game, responsive to effectuating purchase of the virtual items, the purchasing component 28 may be configured to update the user's inventory of virtual items to include the purchased virtual item such that the purchased virtual items are made available to the user for use in the virtual space.

In some implementations, the purchasing component 28 may be configured to, responsive to effectuating purchases of virtual items, send notifications to the users notifying the user of the in-progress and/or completed virtual item purchase(s). In some implementations, notifications may be sent external to the system 10. For example, external notifications may include one or more of a text message sent to a phone number and/or mobile device associated with the user, an email sent to an external email account associated with the user, and/or other external communication path. In some implementations, notifications may be sent internal to the system 10. Internal notifications may include one or more of messages sent through an in-game chat window, discussion board, and/or other considerations of messaging sent to users within the virtual space.

As an illustrative example, referring to FIG. 2, by virtue of the first purchase instructions 48 defined by the first user 40 identifying the first virtual item 46 for purchase, and by virtue of the sale price of the first virtual item 46 being set to a level that satisfies criteria included in the first purchase instructions 48, the purchasing component 28 may effectuate purchase of the first virtual item 46 even if the first user 40 is logged off of the virtual space and/or the online game taking place within the virtual space. The effectuated purchase may be made in accordance with the purchase quantity 50 and/or currency spending amount 52 included in the first purchase instructions 48. Responsive to effectuating purchase of the first virtual item and/or one or more instances of the first virtual item 46, even if the first user 40 is logged off of the virtual space, the purchasing component 28 may be configured to update 53 the first inventory 42 associated with the first user 40 to include the purchase(s) of the first virtual item 46 such that the first virtual item 46 (e.g., or one or more instances of the first virtual item 46) is made available to the first user 40 for use in the virtual space when the first user 40 is logged into the virtual space and/or participating in the online game.

Returning to FIG. 1, the server 12, client computing platforms 34, and/or external resources 38 may be operatively linked via one or more electronic communication links. For example, such electronic communication links may be established, at least in part, via a network 32 such as the Internet and/or other networks. It will be appreciated that this is not intended to be limiting, and that the scope of this disclosure includes implementations in which servers 12, client computing platforms 34, and/or external resources 38 may be operatively linked via some other communication media.

The external resources 38 may include sources of information, hosts and/or providers of virtual spaces outside of system 10, external entities participating with system 10, external entities for player-to-player communications, and/or other resources. In some implementations, some or all of the functionality attributed herein to external resources 38 may be provided by resources included in system 10.

The server 12 may include electronic storage 30, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port or a drive. A port may include a USB port, a firewire port, and/or other port. A drive may include a disk drive and/or other drive. Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 14, information received from server 12, information received from client computing platforms 34, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute components 16, 18, 20, 22, 24, 26, 28. Processor 14 may be configured to execute components 16, 18, 20, 22, 24, 26, 28 by software; hardware; firmware; some combination of software, hardware, and/or firmware; and/or other mechanisms for configuring processing capabilities on processor 14.

It should be appreciated that although components 16, 18, 20, 22, 24, 26, 28 are illustrated in FIG. 1 as being co-located within a single processing unit, in implementations in which processor 14 includes multiple processing units, one or more of components 16, 18, 20, 22, 24, 26, 28 may be located remotely from the other components. The description of the functionality provided by the different components 16, 18, 20, 22, 24, 26, 28 described above is for illustrative purposes, and is not intended to be limiting, as any of components 16, 18, 20, 22, 24, 26, 28 may provide more or less functionality than is described. For example, one or more of components 16, 18, 20, 22, 24, 26, 28 may be eliminated, and some or all of its functionality may be provided by other ones of components 16, 18, 20, 22, 24, 26, and/or 28 and/or other components. As another example, processor 14 may be configured to execute one or more additional components that may perform some or all of the functionality attributed below to one of components 16, 18, 20, 22, 24, 26, 28.

Figure 4:
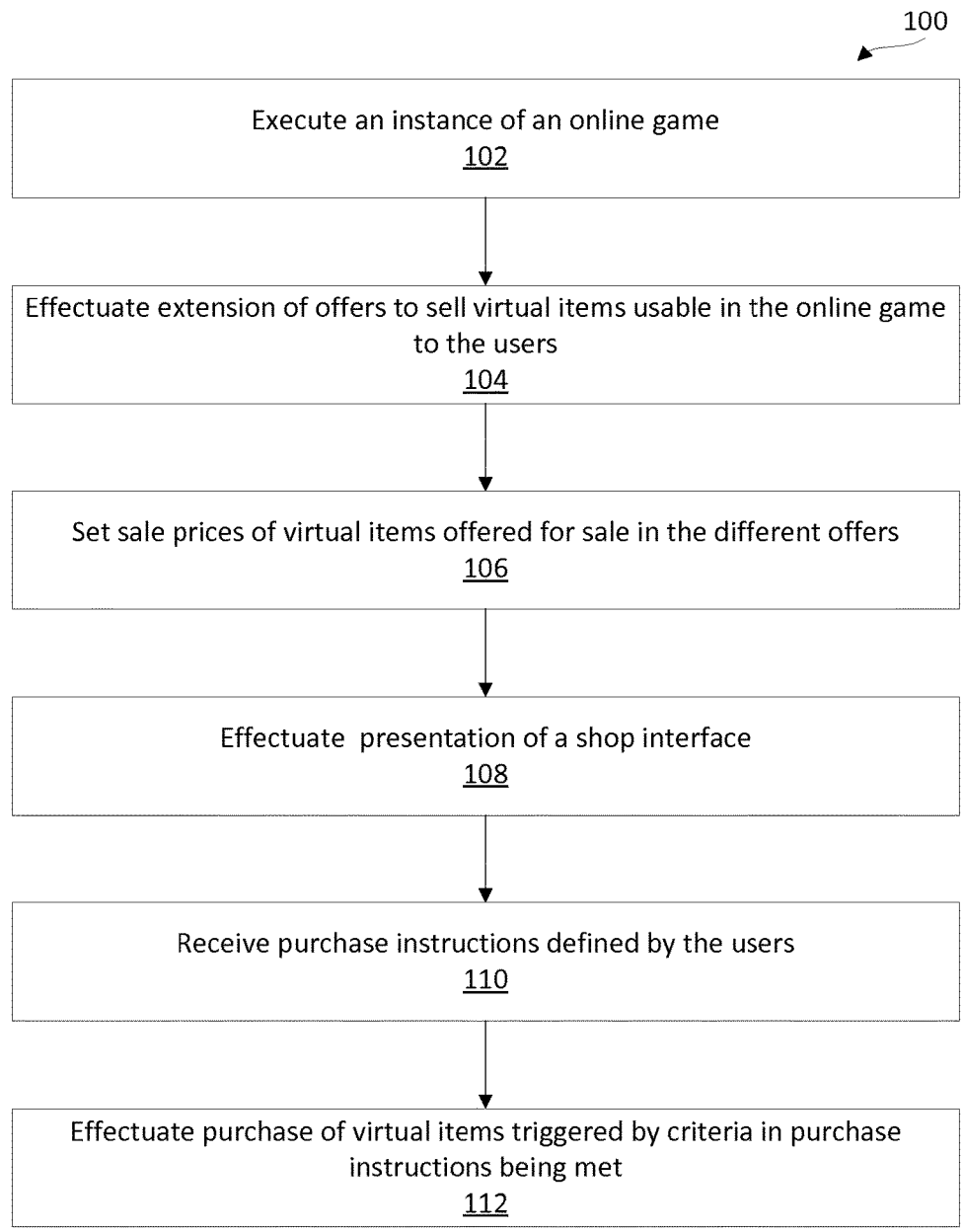
FIG. 4 illustrates a method of automating in-game purchases.

FIG. 4 illustrates a method 100 of automating virtual items purchase in an online game. The operations of method 100 presented below are intended to be illustrative. In some implementations, method 100 may be accomplished with one or more additional operations not described, and/or without one or more of the operations discussed. Additionally, the order in which the operations of method 100 are illustrated in FIG. 4 and described below are not intended to be limiting.

In some implementations, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 4, at an operation 102 an instance of a virtual space and/or an online game taking place within the virtual space may be executed. Executing an instance of an online game may include implementing the instance of the online game to facilitate participation of users in the online game. In some implementations, operation 102 may be performed by a game component the same as or similar to game component 16 (shown in FIG. 1 and described herein).

At an operation 104, offers to sell virtual items usable in the online game may be extended to users. In some implementations, operation 104 may be performed by an offer component the same as or similar to offer component 20 (shown in FIG. 1 and described herein).

At an operation 106, the sales prices of virtual items offered for sale in the different offers may be set. In some implementations, operation 106 may be performed by a price component the same as or similar to price component 22 (shown in FIG. 1 and described herein).

At an operation 108, the presentation of a shop interface to display instances of virtual items to solicit virtual items purchases associated with the offers extended to the users of the online game may be effectuated. In some implementations, operation 108 may be performed by a shop component the same as or similar to shop component 24 (shown in FIG. 1 and described herein).

At an operation 110, purchase instructions defined by the users of the online game including criteria for triggering purchases of virtual items associated with offers extended to the users even if the users are logged off of the online game may be received. In some implementations, operation 110 may be performed by an instructions component the same or similar to instructions component 26 (shown in FIG. 1 and described herein).

At an operation 112, purchase of virtual items offered for sale through the shop interface triggered by criteria in purchase instructions being met may be effectuated. In some implementations, operation 112 may be performed by a purchasing component the same or similar to purchasing component 28 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for automating virtual item purchases in an online game, the system comprising:
   a server including one or more physical processors configured by computer-readable instructions to:
   execute an instance of an online game, and implement the instance of the online game to facilitate participation of users in the online game;
   effectuate extension of offers to sell virtual items usable in the online game to subsets of the users, the offers including a first offer to sell a first virtual item to a first subset of users;
   set prices of items offered for sale to users within the online game, the prices including a first price of the first virtual item;
   set sale prices of the virtual items offered for sale in the offers, wherein the online game sets the sale prices of the virtual items offered for sale to the users, the sale prices including a first sale price of the first virtual item for the first subset of users such that the first offer to sell the first virtual item for the first sale price is not available to users not included in the first subset of users wherein the first sale price of the first virtual item for the first subset of users is different than a sale price offered to at least one other subset of users for the first virtual item, and the first sale price is less than the first price of the first virtual item;
   effectuate presentation of a shop interface to the users of the online game, the shop interface configured to display the offers to the users of the online game to solicit virtual item purchases associated with the offers;
   receive purchase instructions defined by the users of the online game, the purchase instructions including criteria for triggering purchases of the virtual items associated with the offers that were extended to the users even if the users are logged off of the online game, including receiving first purchase instructions from a first user of the online game, wherein the first purchase instructions include first criteria indicating a per item sale price level and a purchase quantity for triggering purchase of the purchase quantity of the first virtual item by the first user, the per item sale price level being below the first sale price; and
   effectuate purchase of virtual items offered for sale triggered by criteria in purchase instructions being met even when the users are logged off of the online game, such that for the first purchase instructions identifying the first virtual item for purchase, and by virtue of the first sale price of the first virtual item being reduced by the online game to at least the per item sale price level that satisfies the first criteria included in the first purchase instructions while the first user is logged off of the online game, and further responsive to the first user being included in the first subset of users while the first user is logged off of the online game, effectuate purchase of the purchase quantity of the first virtual item while the first user is logged off the online game, whereby such purchases made while users are logged off of the online game reduces a server load on the server by such users not having to log on to the online game to purchase the virtual items offered for sale.

2. The system of claim 1 wherein the one or more physical processors are configured to:

manage virtual item inventories associated with the users of the online game, the inventories including one or more virtual items available for use by the users in the online game, including a first inventory of virtual items available for use by the first user; and responsive to effectuating purchase of the first virtual item, when the first user is logged off of the online game, update the first inventory to include the purchase of the first virtual item such that the purchase of the first virtual item is made available to the first user for use in the online game.

3. The system of claim 1 wherein the one or more physical processors are configured such that purchase instructions include a currency spending amount defined by the users, the currency spending amount indicating an amount of currency to spend on the purchases of virtual items when the criteria is satisfied, such that the first purchase instructions include a first currency spending amount defined by the first user which indicates the amount of currency to spend on purchases of the first virtual item when the first criteria included in the first purchase instructions is satisfied.

4. The system of claim 1 wherein the one or more physical processor are configured such that purchases of virtual items are carried out in virtual currency and/or real currency.

5. The system of claim 1 wherein the one or more physical processors are configured such that criteria defined by the users comprises date criteria, such that by virtue of an offer being extended to the users at a date which satisfies the date criteria, the purchase is effectuated.

6. The system of claim 1 wherein the one or more physical processors are configured to, responsive to effectuating purchases of virtual items, send notifications to the users notifying the user of the completed virtual item purchases.

7. The system of claim 6 wherein the one or more physical processors are configured such that the notifications are sent external to the system.

8. The system of claim 7 wherein the one or more physical processors are configured such that the notifications include one or more of a text message sent to a mobile device associated with the user or an email sent to an external email account associated with the user.

9. A method of automating virtual item purchases in an online game, the method being implemented in a computer system including a server including one or more physical processors and storage media storing machine-readable instructions, the method comprising;

executing an instance of an online game, and implementing the instance of the online game to facilitate participation of users in the online game;

effectuating extension of offers to sell virtual items usable in the online game to the users, the offers including a first offer to sell a first virtual item to a first subset of users;

setting prices of items offered for sale to users within the online game, the prices including a first price of the first virtual item;

setting sale prices of the virtual items offered for sale in the offers, wherein the online game sets the sale prices of the virtual items offered for sale to the users, the sale prices including a first sale price of the first virtual item for the first subset of users such that the first offer to sell the first virtual item for the first sale price is not available to users not included in the first subset of users, wherein the first sale price of the first virtual item for the first subset of users is different than a sale price offered to at least one other subset of users for the first virtual item, and the first sale price is less than the first price of the first virtual item;

effectuating presentation of a shop interface to the users of the online game, the shop interface configured to display the offers to the users of the online game to solicit virtual item purchases associated with the offers;

receiving purchase instructions defined by the users of the online game, the purchase instructions including criteria for triggering purchases of the virtual items associated with the offers that were extended to the users even if the users are logged off of the online game, including receiving first purchase instructions from a first user of the online game, wherein the first purchase instructions include first criteria indicating a per item sale price level and a purchase quantity for triggering purchase of the purchase quantity of the first virtual item by the first user, the per item sale price level being below the first sale price; and effectuating purchase of virtual items offered for sale triggered by criteria in purchase instructions being met even when the users are logged off of the online game, such that for the first purchase instructions identifying the first virtual item for purchase, and by virtue of the first sale price of the first virtual item being reduced by the online game to at least the per item sale price level that satisfies the first criteria included in the first purchase instructions while the first user is logged off of the online game, and further responsive to the first user being included in the first subset of users while the first user is logged off of the online game, effectuate purchase of the purchase quantity of the first virtual item while the first user is logged off the online game, whereby such purchases made while users are logged off of the online game reduces a server load on the server by such users not having to log on to the online game to purchase the virtual items offered for sale.

10. The method of claim 9 additionally including:

managing virtual item inventories associated with the users of the online game, the inventories including one or more virtual items available for use by the users in the online game, including a first inventory of virtual items available for use by the first user; and responsive to effectuating purchase of the first virtual item, when the first user is logged off of the online game, updating the first inventory to include the purchase of the first virtual item such that the purchase of the first virtual item is made available to the first user for use in the online game.

11. The method of claim 9 wherein the purchase instructions include a currency spending amount defined by the users, the currency spending amount indicating an amount of currency to spend on the purchases of virtual items when the criteria is satisfied, such that the first purchase instructions include a first currency spending amount defined by the first user which indicates the amount of currency to spend on purchases of the first virtual item when the first criteria included in the first purchase instructions is satisfied.

12. The method of claim 9 wherein purchases of virtual items are carried out in virtual currency and/or real currency.

13. The method of claim 9 wherein the criteria defined by the users comprises date criteria, such that by virtue of an offer being extended to the users at a date which satisfies the date criteria, the purchase is effectuated.

14. The method of claim 9 additionally including, responsive to effectuating purchases of virtual items, sending notifications to the users notifying the user of the completed virtual item purchases.

15. The method of claim 14 wherein the notifications are sent external to the system.

16. The method of claim 15 wherein the notifications include one or more of a text message sent to a mobile device associated with the user or an email sent to an external email account associated with the user.

\* \* \* \* \*

UNITED STATES PATENT AND TRADEMARK OFFICE
CERTIFICATE OF CORRECTION

PATENT NO. : 10,226,691 B1
APPLICATION NO. : 14/169139
DATED : March 12, 2019
INVENTOR(S) : Michael C. DeLaet et al.

Page 1 of 1

It is certified that error appears in the above-identified patent and that said Letters Patent is hereby corrected as shown below:

In the Claims

In Column 14, Line 39, Claim 1, change "users" to --users,--.

Signed and Sealed this
Twenty-fourth Day of November, 2020

Andrei Iancu
*Director of the United States Patent and Trademark Office*